United States Patent
Wu et al.

(10) Patent No.: US 10,749,728 B1
(45) Date of Patent: Aug. 18, 2020

(54) SIGNAL CALIBRATION CIRCUIT, MEMORY STORAGE DEVICE AND SIGNAL CALIBRATION METHOD

(71) Applicant: PHISON ELECTRONICS CORP., Miaoli (TW)

(72) Inventors: Jen-Chu Wu, New Taipei (TW); Yu-Chiang Liao, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/362,725

(22) Filed: Mar. 25, 2019

(30) Foreign Application Priority Data

Feb. 1, 2019 (TW) .............................. 108104030 A (51) Int. Cl.
| | |
|---|---|
| *H04L 27/06* | (2006.01) |
| *H04L 27/38* | (2006.01) |
| *H04B 17/21* | (2015.01) |
| *H04B 1/16* | (2006.01) |

(52) U.S. Cl.
CPC ............... *H04L 27/38* (2013.01); *H04B 1/16* (2013.01); *H04B 17/21* (2015.01)

(58) Field of Classification Search
CPC ............ H04L 27/38; H04B 17/21; H04B 1/16
USPC ...................................................... 375/340
See application file for complete search history.

(56) References Cited

U.S. PATENT DOCUMENTS

| | | | | |
|---|---|---|---|---|
| 2003/0217222 A1* | 11/2003 | Deutscher | ............. | G06F 11/073 711/103 |
| 2008/0315963 A1* | 12/2008 | Huang | ...................... | H03L 7/18 331/74 |
| 2011/0254603 A1* | 10/2011 | Kamath | .................... | H03L 7/00 327/158 |
| 2014/0055179 A1* | 2/2014 | Gong | ...................... | H03L 7/104 327/156 |
| 2014/0153680 A1* | 6/2014 | Garg | ..................... | H04L 7/0025 375/371 |
| 2014/0320218 A1* | 10/2014 | Ippolito | .................... | H03L 7/00 331/34 |
| 2015/0200765 A1* | 7/2015 | Bonaccio | .............. | H04L 7/0029 375/374 |
| 2019/0187744 A1* | 6/2019 | Chang | ................. | G11C 11/4096 |

* cited by examiner

*Primary Examiner* — Helene E Tayong
(74) *Attorney, Agent, or Firm* — JCIPRNET (57) ABSTRACT

A signal calibration circuit including a first phase interpolator, a second phase interpolator, a phase detector, a control circuit and a delay circuit is provided according to an exemplary embodiment of the disclosure. The first phase interpolator is configured to receive a plurality of first signals and generate a plurality of first quadrature signals according to the first signals. The second phase interpolator is configured to generate a second signal according to the first quadrature signals. The phase detector is configured to detect a phase difference between the second signal and one of the first signals. The control circuit is configured to generate a calibration parameter according to the phase difference. The delay circuit is configured to adjust at least one of the first signals according to the calibration parameter, such that the adjusted first signal includes a plurality of second quadrature signals.

21 Claims, 6 Drawing Sheets

SIGNAL CALIBRATION CIRCUIT, MEMORY STORAGE DEVICE AND SIGNAL CALIBRATION METHOD

CROSS-REFERENCE TO RELATED APPLICATION

This application claims the priority benefit of Taiwan application serial no. 108104030, filed on Feb. 1, 2019. The entirety of the above-mentioned patent application is hereby incorporated by reference herein and made a part of this specification.

BACKGROUND

Technical Field

The disclosure relates to a signal calibration technique, and more specifically to a signal calibration circuit, a memory storage device, and a signal calibration method.

Description of Related Art

Along with the widespread of digital cameras, cell phones, and MP3 in recently years, the consumers' demand to storage media has increased drastically. Rewritable non-volatile memory module (e.g., flash memory) is highly suitable for being embedded in the various portable multimedia devices listed above due to its characteristics such as data non-volatility, low power consumption, small volume, non-mechanical structure.

In the signal transmitting process, the in-phase component signal and the quadrature component signal in the clock signal may be mismatched, for example, the phase difference between the in-phase component signal and the quadrature component signal may not be 90 degrees, which affects signal analysis performance. In some applications, although the exclusive OR (XOR) gate may be used to detect the mismatch between the in-phase component signal and the quadrature component signal, in practice, the non-ideal effect of the XOR gate may reduce the correctness of the detection result, thereby decreasing the data transmission performance.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a signal calibration circuit, a memory storage device and a signal calibration method, which can improve the calibration efficiency for mismatched signals.

A signal calibration circuit including a first phase interpolator, a second phase interpolator, a phase detector, a control circuit and a delay circuit is provided according to an exemplary embodiment of the disclosure. The first phase interpolator is configured to receive a plurality of first signals and generate a plurality of first quadrature signals according to the first signals. The second phase interpolator is coupled to the first phase interpolator and configured to generate a second signal according to the first quadrature signals. The phase detector is coupled to the second phase interpolator and configured to detect a phase difference between the second signal and one of the first signals. The control circuit is coupled to the phase detector and configured to generate a calibration parameter according to the phase difference. The delay circuit is coupled to the first phase interpolator and the control circuit and configured to adjust at least one of the first signals according to the calibration parameter, such that the first signals include a plurality of second quadrature signals.

An exemplary embodiment of the disclosure further provides a memory storage device including a connection interface unit, a rewritable non-volatile memory module and a memory control circuit unit. The connection interface unit is configured to be coupled to a host system. The memory control circuit unit is coupled to the connection interface unit and the rewritable non-volatile memory module. The connection interface unit includes a signal calibration circuit. The signal calibration circuit is configured to receive a plurality of first signals and generate a plurality of first quadrature signals according to the first signals. The signal calibration circuit is further configured to generate a second signal according to the first quadrature signals. The signal calibration circuit is further configured to detect a phase difference between the second signal and one of the first signals. The signal calibration circuit is further configured to generate a calibration parameter according to the phase difference. The signal calibration circuit is further configured to adjust at least one of the first signals according to the calibration parameter, such that the first signals include a plurality of second quadrature signals.

An exemplary embodiment of the disclosure further provides a signal calibration method for a memory storage device. The signal calibration method includes: receiving a plurality of first signals and generating a plurality of first quadrature signals according to the first signals; generating a second signal according to the first quadrature signals; detecting a phase difference between the second signal and one of the first signals; generating a calibration parameter according to the phase difference; and adjusting at least one of the first signals according to the calibration parameter, such that the first signals include a plurality of second quadrature signals.

Based on the above, the first phase interpolator can receive a plurality of first signals and generate a plurality of first quadrature signals according to the first signals. The second phase interpolator can generate a second signal according to the first quadrature signals. The phase detector can detect a phase difference between the second signal and one of the first signals. The control circuit can generate a calibration parameter according to the phase difference. The delay circuit can adjust at least one of the first signals according to the calibration parameter, such that the first signals include a plurality of second quadrature signals. In this manner, the signals being mismatched in the first signals can be effectively calibrated to quadrature signals, thereby improving the calibration efficiency for the mismatched signals.

In order to make the aforementioned features and advantages of the disclosure more comprehensible, embodiments accompanying figures are described in detail below.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Herein, several embodiments of the disclosure are introduced to describe the disclosure; however the disclosure is not limited by the embodiments. Suitable combinations among the embodiments are also allowed. The term "coupled to" used throughout the embodiments (including claims) may refer to any direct and indirect connection means. For example, if a first device is described as being coupled to a second device in the embodiments, the sentence should be interpreted as the first device may be connected to the second device directly, or the first device may, through any other device or through certain connection means, be connected to the second device indirectly. In addition, the word "signal" may refer to at least one current, voltage, electric charge, temperature, data, or any other signal or signals.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
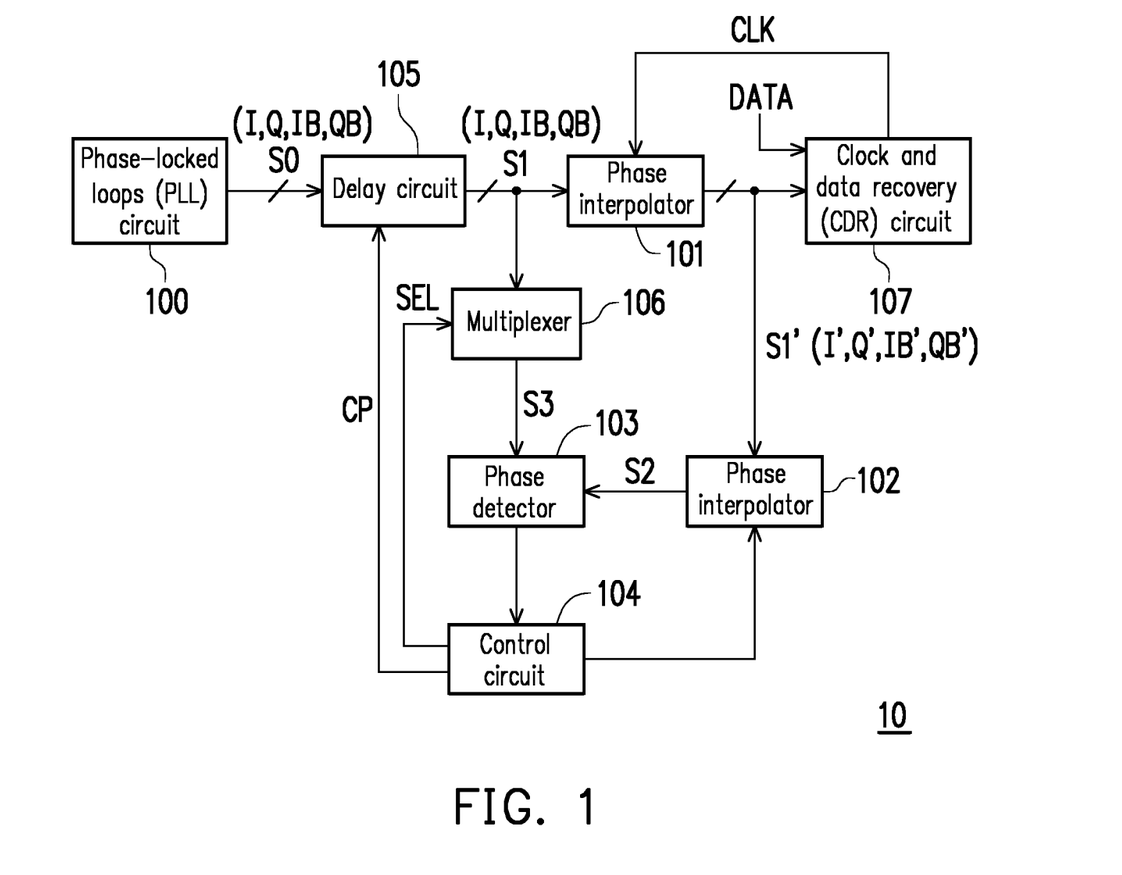
FIG. 1 is a schematic view of a signal calibration circuit according to an exemplary embodiment of the disclosure.

FIG. 1 is a schematic view of a signal calibration circuit according to an exemplary embodiment of the disclosure. Referring to FIG. 1, the signal calibration circuit 10 may be used to receive a signal S0. The signal S0 may be generated by a phase-locked loops (PLL) circuit 100. The PLL circuit 100 may be included in the signal calibration circuit 10 or independent from the signal calibration circuit 10. The signal S0 may include a plurality of signals independently transmitted through a plurality of channels. For example, the signal S0 may include signals I, Q, IB, and QB. In addition, each signal in the signal S0 may be regarded as a clock signal.

In an ideal state, the signals I and Q are preset to a quadrature signal set (i.e., the phase difference between the signals I and Q is preset to 90 degrees), and the signals IB and QB are preset to be a quadrature signal set (i.e., the phase difference between the signals IB and QB is preset to 90 degrees), the signals I and IB are inverted (i.e., the phase difference between the signals I and IB is preset to 180 degrees), and the signals Q and QB are inverted (i.e., the phase difference between the signals Q and QB is preset to 180 degrees). In addition, the signals I and Q (or signals IB and QB) are also respectively referred to as an in-phase component signal and a quadrature component signal in one quadrature signal set.

However, through the channel interference, the two signals preset as a quadrature signal set in the signal S0 may not be quadrature (also referred to as mismatch). For example, through the channel interference, the phase difference between the signals I and Q may not be equal to 90 degrees, and/or the phase difference between the signals IB and QB may not be equal to 90 degrees. If the phase difference between two signals (for example, signals I and Q) preset as a quadrature signal set is too far from 90 degrees, using these two signals to analyze other signals (for example, a data signal carrying data bit of 0/1) or control other electronic element is likely to cause error to the system. In an exemplary embodiment, the signal calibration circuit 10 may calibrate the signal S0 by at least two phase interpolators such that the calibrated signal S0 includes the correct quadrature signal set.

In an exemplary embodiment, the signal calibration circuit 10 includes a phase interpolator (also referred to as a first phase interpolator) 101, a phase interpolator (also referred to as a second phase interpolator) 102, a phase detector 103, a control circuit 104, a delay circuit (also referred to as a delay line circuit) 105 and a multiplexer 106. The delay circuit 105 is configured to receive the signal S0 and adjust the signal S0 to generate a signal (also referred to as a first signal) S1. For example, the delay circuit 105 may include a plurality of delay units (not shown) that are serially connected to each other. Each delay unit may be an amplifier or other type of delay element. The delay circuit 105 may delay a signal among the signals S0 based on a certain delay stage to change the frequency and/or phase of this signal. A delay stage corresponds to a signal delay amount. Different delay stages correspond to different signal delay amounts. For example, the delay circuit 105 may delay the signals I, Q, IB, and QB based on the same or different delay stages. As such, the signal S1 may include the delayed signals I, Q, IB, and QB.

The phase interpolator 101 is coupled to the delay circuit 105. The phase interpolator 101 is configured to receive the signal S1 and generate a signal S1'. The signal S1' includes a plurality of quadrature signals (also known as first quadrature signals). For example, the signal S1' may include signals I', Q', IB', and QB'. The signals I' and Q' are a quadrature signal set (i.e., the phase difference between the signals I' and Q' is 90 degrees), and the signals IB' and QB' are a quadrature signal set (i.e., the phase difference between the signal IB' and QB' is 90 degrees), the signals I' and IB' are inverted (i.e., the phase difference between the signals I' and IB' is 180 degrees), and the signals Q' and QB' are inverted (i.e., the phase difference between the signals Q' and QB' is 180 degrees). For example, the phase interpolator 101 may perform a phase interpolation on the signals I and Q to generate the signal I'. For example, the phase interpolator 101 may perform a phase interpolation on the signals Q and IB to generate the signal Q'. For example, the phase interpolator 101 may perform a phase interpolation on the signals IB and QB to generate the signal IB'. For example, the phase interpolator 101 may perform a phase interpolation on the signals QB and I to generate the signal QB'.

Figure 2:
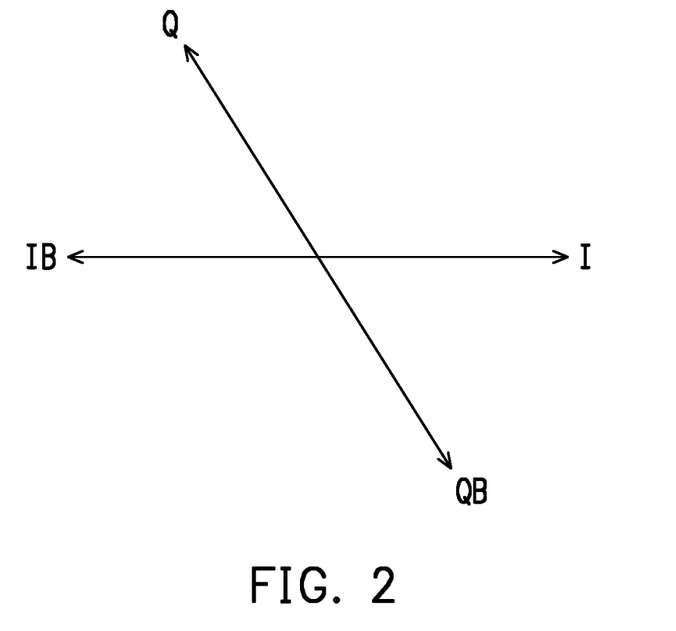
FIG. 2 is a schematic view of a phase of a first signal according to an exemplary embodiment of the disclosure.
Figure 3:
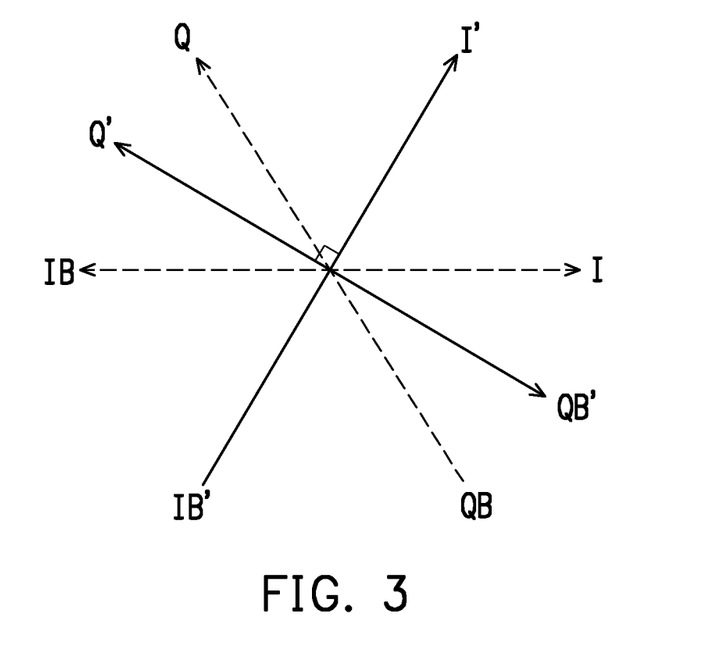
FIG. 3 is a schematic view of a phase of a first quadrature signal according to an exemplary embodiment of the disclosure.

FIG. 2 is a schematic view of a phase of a first signal according to an exemplary embodiment of the disclosure. FIG. 3 is a schematic view of a phase of a first quadrature signal according to an exemplary embodiment of the disclosure. Referring to FIG. 2, it is assumed that the phase difference between the signals I and Q is not equal to 90 degrees and the phase difference between the signals IB and QB is not equal to 90 degrees after the channel interference. Referring to FIG. 3, the phase of the signal I' may be obtained according to the phase of the signal I (for example, i degree) and the phase of the signal Q (for example, q degree), and the phase of the signal Q' may be obtained according to the phase of the signal IB (for example, i bar degree) and the phase of the signal Q. For example, if it is assumed that the phase of the signal I is 0 degree and the phase of the signal Q is 120 degrees (the phase difference between the signals I and Q is not 90 degrees), the phase of the signal I' may be 60 degrees ((0+120)/2=60, i.e., (i+q)/2), and the phase of the signal Q' may be 150 degrees ((180+120)/2=150, i.e., (i bar+q)/2). It should be noted that the disclosure provides no limitation to how to generate quadrature signals I' and Q' (or IB' and QB') according to the signals I, Q, IB and QB. For example, in an exemplary embodiment, the phase of the signal Q' may also be obtained according to the phase of the signal I and the phase (e.g., q bar degree) of the signal QB ((0+300)/2=150, i.e., (i+q bar)/2).

The phase interpolator 102 is coupled to the phase interpolator 101. The phase interpolator 102 may receive the signal S1' and generate a signal (also referred to as a second signal) S2 according to the signal S1'. For example, the signals I', Q', IB', and QB' in the signal S1' may be used as the base of the phase interpolator 102 to generate a signal S2 corresponding to a certain phase. For example, the phase of the signal S2 may be any degree between 0 degree to 360 degrees.

The phase detector 103 is coupled to the phase interpolator 102 and the multiplexer 106. The phase detector 103 is configured to receive the signal S2. In addition, the phase detector 103 is further configured to receive a signal S3 from the multiplexer 106. The multiplexer 106 is coupled to the delay circuit 105 and the phase detector 103. The multiplexer 106 may selectively transmit a signal in the signal S1 as the signal S3 to the phase detector 103 according to a signal (also referred to as the selection signal) SEL. For example, the signal S3 may be one of the signals I, Q, IB, and QB. The phase detector 103 may be configured to detect a phase difference between the signals S2 and S3.

The control circuit 104 is coupled to the phase interpolator 102, the phase detector 103, and the delay circuit 105. The control circuit 104 may include a central processing unit (CPU), a graphics processor (GPU), or other programmable general-purpose or special-purpose microprocessor, a digital signal processor, a programmable controller, a special application integrated circuit, a programmable logic device or other similar devices or a combination of these devices. The control circuit 104 is configured to generate a calibration parameter CP according to the phase difference between the signals S2 and S3. The control circuit 104 can provide the calibration parameter CP to the delay circuit 105. The calibration parameter CP is configured to control the delay amount of the delay circuit 105 with respect to at least one of the signals I, Q, IB, and QB. For example, the delay circuit 105 may delay the signals I, Q, IB, and/or QB in the signal S0 according to the calibration parameter CP, such that the signals I and Q (or IB and QB) in the signal S1 are quadrature with each other. In an exemplary embodiment, the signals I and Q (and/or IB and QB) quadrature with each other in the signal S1 are also referred to as second quadrature signals.

In an exemplary embodiment, the control circuit 104 may instruct the multiplexer 106 to transmit the signal I (or Q) to the phase detector 103 through the signal SEL and instruct the phase interpolator 102 to generate the signal S2 having a certain phase. Then, the control circuit 104 may generate the calibration parameter CP according to the phase difference between the signal S2 and the signal I (or Q) and a predetermined quadrature relationship between the signals I and Q, so as to calibrate the signals I and/or Q. Similarly, in an exemplary embodiment, the control circuit 104 may instruct the multiplexer 106 to transmit the signal IB (or QB) to the phase detector 103 through the signal SEL and instruct the phase interpolator 102 to generate a signal S2 having a certain phase. Then, the control circuit 104 may generate the calibration parameter CP according to the phase difference between the signal S2 and the signal IB (or QB) and a predetermined quadrature relationship between the signals IB and QB, so as to calibrate the signals IB and/or QB. The calibrated signals I and Q (or IB and QB) can be restored to a predetermined quadrature state.

Figure 4:
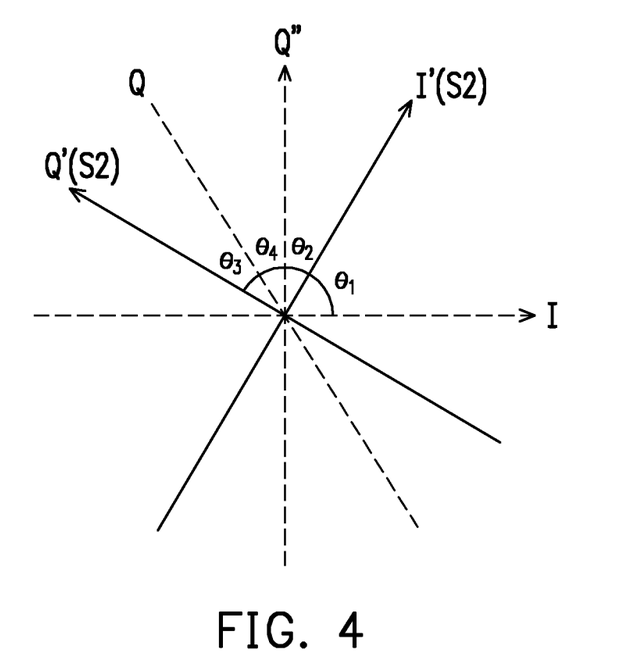
FIG. 4 is a schematic view illustrating determining a calibration parameter according to an exemplary embodiment of the disclosure.
Figure 5:
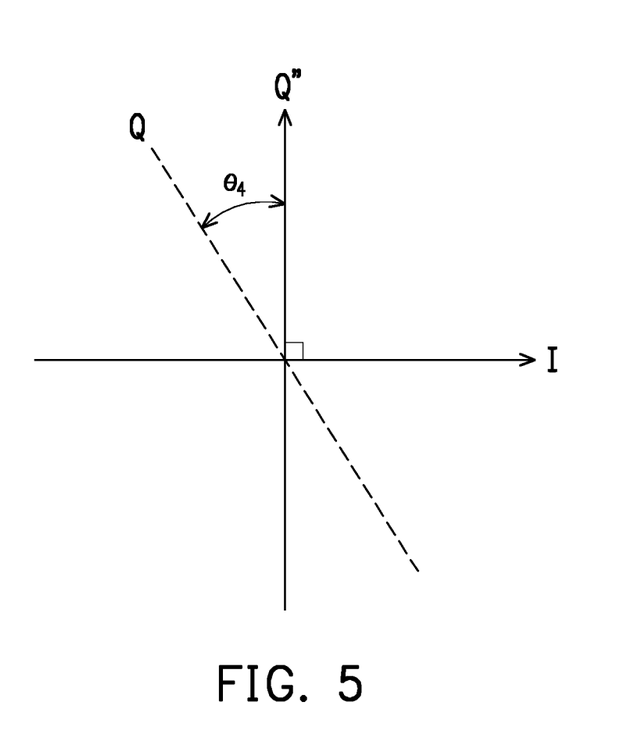
FIG. 5 is a schematic view illustrating adjusting the phase of a first signal according to an exemplary embodiment of the disclosure.

FIG. 4 is a schematic view illustrating determining a calibration parameter according to an exemplary embodiment of the disclosure. FIG. 5 is a schematic view illustrating adjusting the phase of a first signal according to an exemplary embodiment of the disclosure. Referring to FIG. 1 and FIG. 4, the control circuit 104 may instruct the multiplexer 106 to transmit the signal I to the phase detector 103 by the signal SEL. Additionally, the control circuit 104 may instruct the phase interpolator 102 to generate a signal S2 having a certain phase (also referred to as a first phase). Here, for convenience of explanation, it is assumed that the first phase is equal to the phase of the signal I'. The control circuit 104 may detect a phase difference Θ1 between the signal I and the signal S2 (or I'). The phase difference Θ1 is also referred to as a first difference value between the first phase and the phase of the signal I. According to the phase difference Θ1 and the predetermined quadrature relationship between the signals I and Q (i.e., the predetermined phase difference between the signals I and Q is 90 degrees), the control circuit 104 may obtain a phase difference Θ2

($\Theta2=90-\Theta1$) between the calibrated signal Q″ and the signal S2. For example, if $\Theta1$ is 60 degrees, then $\Theta2$ may be 30 degrees.

After obtaining the phase difference $\Theta1$, the control circuit 104 may instruct the multiplexer 106 to transmit the signal Q to the phase detector 103 by the signal SEL. In the meantime, the control circuit 104 may instruct the phase interpolator 102 to generate the signal S2 having another phase (also referred to as a second phase). Here, for convenience of explanation, it is assumed that the second phase is equal to the phase of the signal Q′. The control circuit 104 may detect a phase difference $\Theta3$ between the signal Q and the signal S2 (or Q′). The phase difference $\Theta3$ is also referred to as a second difference value between the second phase and the phase of the signal Q. According to the phase differences $\Theta2$, $\Theta3$ and the quadrature relationship between the signals I′ and Q′ (i.e., the phase difference between the signals I′ and Q′ is 90 degrees), the control circuit 104 may obtain a phase difference $\Theta4$ ($\Theta4=90-\Theta2-\Theta3$) between the signal Q to be calibrated and the calibrated signal Q″. For example, assuming that $\Theta2$ is 30 degrees and $\Theta3$ is 30 degrees, then $\Theta4$ may be 30 degrees. The control circuit 104 may generate a corresponding calibration parameter CP based on the phase difference $\Theta4$ to instruct the delay circuit 105 to delay the signals I and/or Q to reduce the phase difference between the signals I and Q by $\Theta4$. In this manner, the phase difference between the calibrated signals I and Q may be restored to 90 degrees (i.e., the predetermined quadrature state).

It should be noted that, although the exemplary embodiment of FIG. 4 exemplifies the phases of the signals I′ and Q′ as the phases of the signal S2, in another exemplary embodiment, the phases of the signal S2 may also be other phases generated according to the signals I′ and Q′ (or IB′ or QB′) served as the base, the disclosure provides no limitation thereto. In addition, although the exemplary embodiment of FIG. 4 shows calibration of the signals I and Q as an example, the same or similar calibration mechanism may also be used to calibrate the signals IB and QB such that the phase difference between the calibrated signals IB and QB is restored to 90 degrees (i.e., the predetermined quadrature state), and the details are not repeated here.

In an exemplary embodiment, the signal calibration circuit 10 further includes a clock and data recovery (CDR) circuit 107. The CDR circuit 107 is coupled to the phase interpolator 101. During the period of calibrating the signal S0 (or S1), the CDR circuit 107 is not activated. For example, during the period of calibrating the signal S0 (or S1), the CDR circuit 107 may be in a disabled or idle state. In addition, during the period of calibrating the signal S0 (or S1), the phase of the output signal (i.e., signal S1′) of the phase interpolator 101 may be locked (e.g., locked to the phase of the signals I′, Q′, IB′, and QB′ of FIG. 3) and is not affected by the CDR circuit 107 to avoid affecting the calibration of the signal S0 (or S1).

After the calibration of the signal S0 (or S1) is completed, the signals I and Q (or IB and QB) in the signal S0 (or S1) may be quadrature with each other and served as the base of the phase interpolator 101. In addition, after the calibration of the signal S0 (or S1) is completed, the CDR circuit 107 may be activated to receive the data signal DATA and the signal S1′ and generate the output clock CLK. In the operation of the CDR circuit 107, the phase interpolator 101 may receive the output clock CLK, and the phase of the output signal (i.e., the signal S1′) of the phase interpolator 101 may be varied in response to variation of the output clock CLK. In this manner, in the operation of the CDR circuit 107, the phase of a certain signal (for example, signal I) in the signal S1′ may be locked at an appropriate position according to the data signal DATA to effectively sample the data signal DATA.

Figure 6:
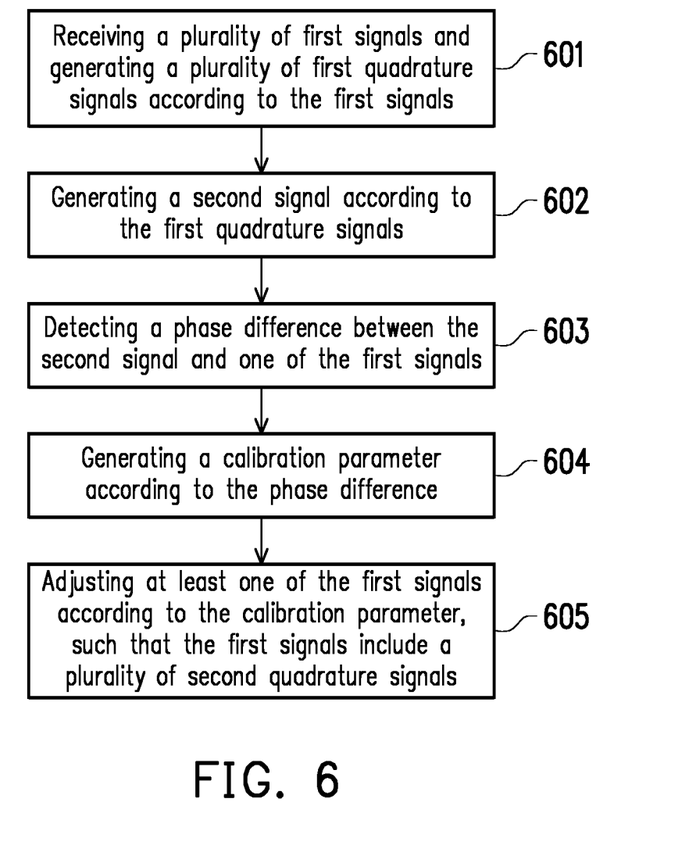
FIG. 6 is a flowchart of a signal calibration method according to an exemplary embodiment of the disclosure.

FIG. 6 is a flowchart of a signal calibration method according to an exemplary embodiment of the disclosure. Referring to FIG. 6, in step S601, a plurality of first signals are received and a plurality of first quadrature signals are generated according to the first signals. In step S602, a second signal is generated according to the first quadrature signals. In step S603, a phase difference between the second signal and one of the first signals is detected. In step S604, a calibration parameter is generated according to the phase difference. In step S605, at least one of the first signals is adjusted according to the calibration parameter such that the first signal includes a plurality of second quadrature signals.

However, the steps in FIG. 6 have been described in detail above, and will not be described again here. It should be noted that the steps in FIG. 6 may be implemented as multiple program codes or circuits, and the disclosure provides no limitation thereto. In addition, the method in FIG. 6 may be used in combination with the above exemplary embodiments, or may be used alone, and the disclosure provides no limitation thereto.

In an exemplary embodiment, the signal calibration circuit 10 of FIG. 1 may be disposed in a memory storage device. In general, a memory storage device (also referred to as a memory storage system) includes a rewritable non-volatile memory module and a controller (also referred to as a control circuit). Typically, the memory storage device is used with a host system to enable the host system to write data to or read data from the memory storage device.

Figure 7:
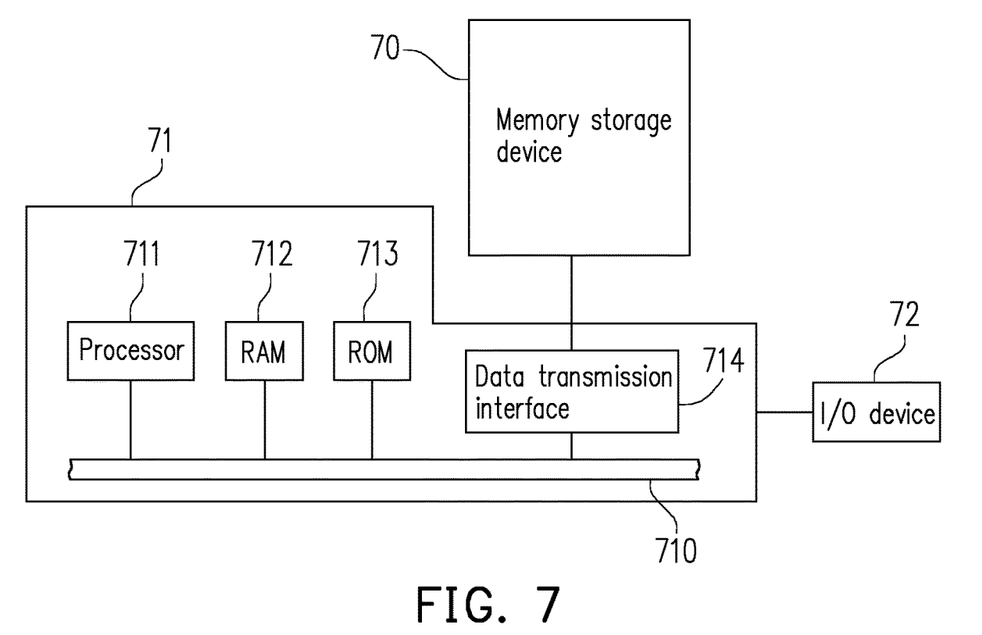
FIG. 7 is a schematic view of a host system, a memory storage device, and an input/output (I/O) device according to an exemplary embodiment of the disclosure.
Figure 8:
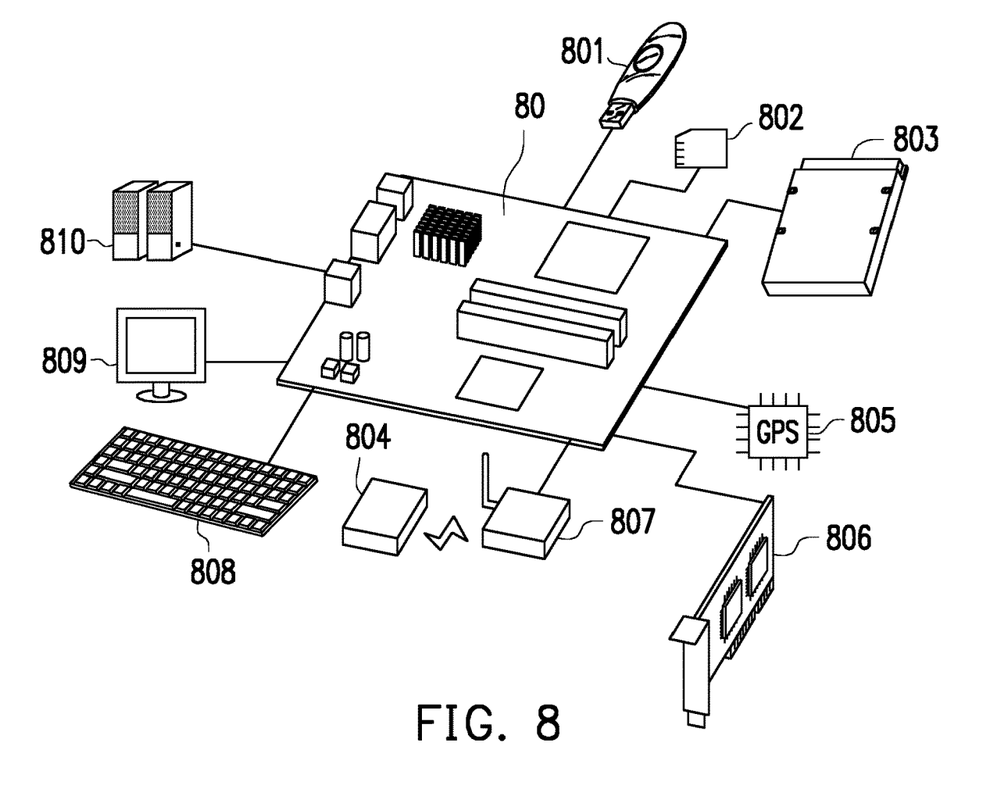
FIG. 8 is a schematic view of a host system, a memory storage device, and an I/O device according to another exemplary embodiment of the disclosure.

FIG. 7 is a schematic view of a host system, a memory storage device, and an input/output (I/O) device according to an exemplary embodiment of the disclosure. FIG. 8 is a schematic view of a host system, a memory storage device, and an I/O device according to another exemplary embodiment of the disclosure.

Referring to FIG. 7 and FIG. 8, a host system 71 generally includes a processor 711, a random access memory (RAM) 712, a read only memory (ROM) 713 and a data transmission interface 714. The processor 711, the random access memory 712, the read only memory 713, and the data transmission interface 714 are all coupled to a system bus 710.

In the present exemplary embodiment, the host system 71 is coupled to the memory storage device 70 through the data transmission interface 714. For example, the host system 71 may store data into or read data from the memory storage device 70 through the data transmission interface 714. In addition, the host system 71 is coupled to the I/O device 72 through the system bus 710. For example, the host system 71 may transmit output signals to or receive input signals from the I/O device 72 through the system bus 710.

In the present exemplary embodiment, the processor 711, the random access memory 712, the read only memory 713, and the data transmission interface 714 may be disposed on the main board 80 of the host system 71. The number of the data transmission interface 714 may be one or more. Through the data transmission interface 714, the main board 80 may be coupled to the memory storage device 70 in a wired or wireless manner. The memory storage device 70 may be, for example, a flash drive 801, a memory card 802, a solid state drive (SSD) 803, or a wireless memory storage device 804. The wireless memory storage device 804 may be, for example, a memory storage device based on various wireless communication technologies, such as a near field communication (NFC) memory storage device, a wireless fidelity (WiFi) memory storage device, a Bluetooth memory storage device, or a BLE (Bluetooth low energy) memory storage device (e.g., iBeacon). Further, the main board 80 may also be coupled to various I/O devices, such as a GPS (Global Positioning System) module 805, a network interface card 806, a wireless transmission device 807, a keyboard 808, a monitor 809 and/or a speaker 810 through the system bus 710. For example, in an exemplary embodiment, the main board 80 may access the wireless memory storage device 804 through the wireless transmission device 807.

Figure 9:
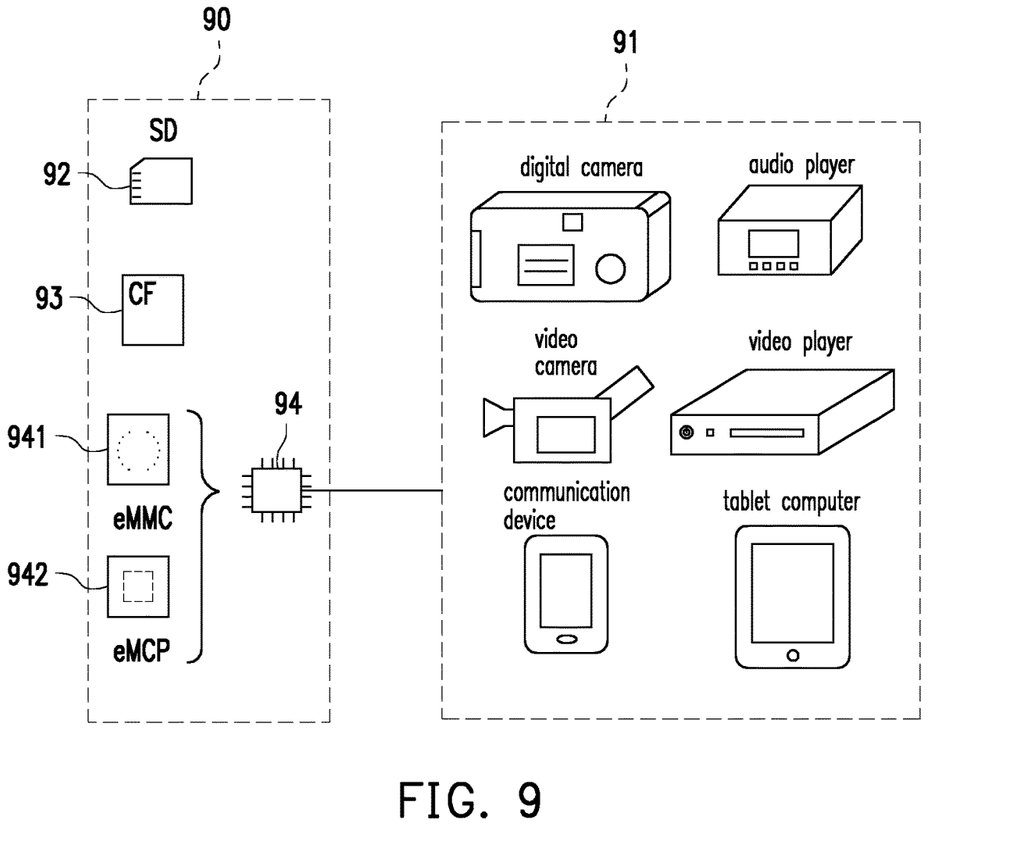
FIG. 9 is a schematic view of a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 9 is a schematic view illustrating a host system and a memory storage device according to another exemplary embodiment of the disclosure. Referring to FIG. 9, in another exemplary embodiment, a host system 91 may also be a system such as a digital camera, a video camera, a communication device, an audio player, a video player or a tablet computer, whereas a memory storage device 90 may be various non-volatile memory storage devices used by the host system 91, such as a SD (Secure Digital) card 92, a CF (Compact Flash) card 93 or an embedded storage device 94. The embedded storage device 94 includes various embedded storage devices capable of directly coupling a memory module onto a substrate of the host system, such as an eMMC (embedded Multi Media Card) 941 and/or an eMCP (embedded Multi Chip Package) storage device 942.

Figure 10:
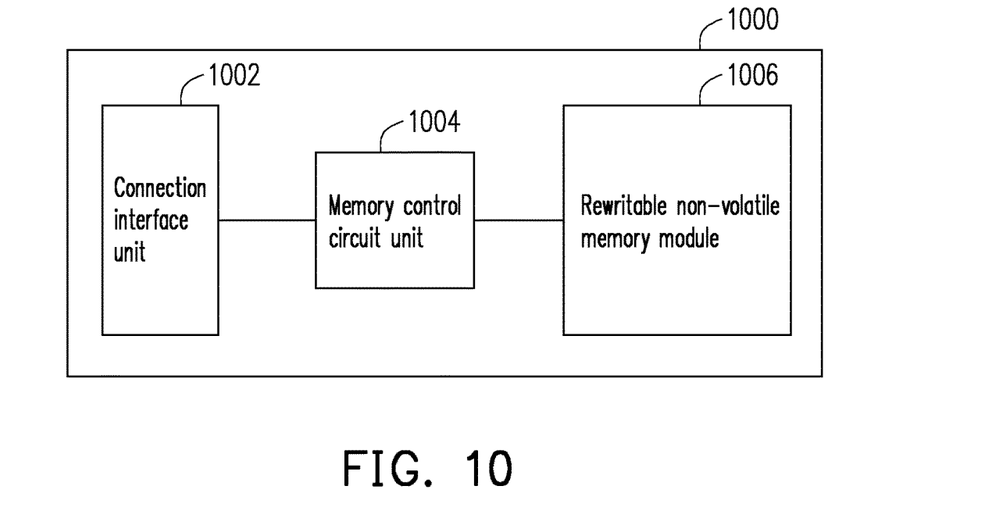
FIG. 10 is a schematic block diagram of a memory storage device according to an exemplary embodiment of the disclosure.

FIG. 10 is a schematic block diagram illustrating a memory storage device according to an exemplary embodiment of the disclosure. Referring to FIG. 10, the memory storage device 1000 includes a connection interface unit 1002, a memory control circuit unit 1004 and a rewritable non-volatile memory module 1006.

The connection interface unit 1002 is configured to couple the memory storage device 1000 to the host system 71. The memory storage device 1000 may communicate with the host system 71 through the connection interface unit 1002. In the present exemplary embodiment, the connection interface unit 1002 is compatible with a SATA (Serial Advanced Technology Attachment) standard. Nevertheless, it should be understood that the disclosure is not limited thereto. The connection interface unit 1002 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 1002 and the memory control circuit unit 1004 may be packaged into one chip, or the connection interface unit 1002 is distributed outside of a chip containing the memory control circuit unit 1004.

The memory control circuit unit 1004 is configured to execute a plurality of logic gates or control commands which are implemented in a hardware form or in a firmware form and perform operations, such as writing, reading or erasing data in the rewritable non-volatile memory module 1006 according to the commands of the host system 71.

The rewritable non-volatile memory module 1006 is coupled to the memory control circuit unit 1004 and configured to store data written from the host system 71. The rewritable non-volatile memory module 1006 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or any memory module having the same features.

Each of the memory cells in the rewritable non-volatile memory modules 1006 stores one or more bits based on a variation in voltage (hereinafter also referred to as a threshold voltage). Specifically, there is a charge trapping layer between the control gate and the channel of each memory cell. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming memory cell". Each of the memory cells in the rewritable non-volatile memory modules 1006 has a plurality of storage states along with variation of the threshold voltage. By applying the read voltage, it may be determined which storage state that a memory cell belongs to, thereby obtaining one or more bits stored in the memory cell.

In the present exemplary embodiment, the memory cells of the rewritable non-volatile memory module 1006 may constitute a plurality of physical programming units, and the physical programming units may constitute a plurality of physical erasing units. Specifically, the memory cells on the same word line may form one or more physical programming units. If each memory cell may store two or more bits, the physical programming units on the same word line may be at least classified into a lower physical programming unit and an upper physical programming units. For example, a least significant bit (LSB) of a memory cell belongs to a lower physical programming unit, and a most significant bit (MSB) of a memory cell belongs to an upper physical programming unit. In general, in the MLC NAND flash memory, the write speed of the lower physical programming unit is greater than the write speed of the upper physical programming unit, and/or the reliability of the lower physical programming unit is higher than the reliability of the upper physical programming unit.

In an exemplary embodiment, the physical programming unit is the minimum unit for programming. That is, the physical programming unit is the minimum unit for writing data. For example, the physical programming unit may be a physical page or a physical sector. If the physical programming unit is a physical page, the physical programming units may include a data bit area and a redundancy bit area. The data bit area includes a plurality of physical sectors for storing user data, and the redundant bit area is used to store system data (for example, management data such as error-correction codes). In an exemplary embodiment, the data bit area includes 32 physical sectors, and one physical sector has a size of 512 B (byte). However, in other exemplary embodiments, the data bit area may also contain 8, 16, or a greater or lesser number of physical sectors, and the size of each of the physical sectors may also be larger or smaller. On the other hand, the physical erasing unit is the minimum unit for erasing. That is, each physical erasing unit contains the smallest number of memory cells being erased together. For example, the physical erasing unit is a physical block.

In an exemplary embodiment, the rewritable non-volatile memory module 1006 in FIG. 10 is also referred to as a flash memory module. In an exemplary embodiment, the memory control circuit unit 1004 in FIG. 10 is also referred to as a flash memory controller for controlling a flash memory module. In an exemplary embodiment, the signal calibration circuit 10 may be disposed in the connection interface unit 1002 or the memory control circuit unit 1004 in FIG. 10. For example, the signal calibration circuit 10 may be used to process data signals and/or clock signals from the host system.

In summary, the first phase interpolator may receive a plurality of first signals and generate a plurality of first quadrature signals according to the first signals. The second phase interpolator may generate a second signal according to the first quadrature signals. The phase detector may detect a phase difference between the second signal and one of the first signals. The control circuit may generate a calibration parameter according to the phase difference. The delay circuit may adjust at least one of the first signals according to the calibration parameter, such that the first signal includes a plurality of second quadrature signals. In this manner, the signal set that may be mismatched in the first signal may be effectively calibrated to a quadrature signal set, thereby improving the calibration efficiency for the mismatched signal.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A signal calibration circuit, comprising:
   a first phase interpolator, configured to receive a plurality of first signals and generate a plurality of first quadrature signals according to the plurality of first signals;
   a second phase interpolator, coupled to the first phase interpolator and configured to generate a second signal according to the plurality of first quadrature signals;
   a phase detector, coupled to the second phase interpolator and configured to detect a phase difference between the second signal and one of the plurality of first signals;
   a control circuit, coupled to the phase detector and configured to generate a calibration parameter according to the phase difference; and
   a delay circuit, coupled to the first phase interpolator and the control circuit, and configured to adjust at least one of the plurality of first signals according to the calibration parameter, such that the plurality of first signals comprise a plurality of second quadrature signals.

2. The signal calibration circuit according to claim 1, wherein the operation that the first phase interpolator generates the plurality of first quadrature signals according to the plurality of first signals comprises:
   performing a phase interpolation on an in-phase component signal and a quadrature component signal among the plurality of first signals to generate one of the plurality of first quadrature signals.

3. The signal calibration circuit according to claim 1, wherein the operation that the control circuit generates the calibration parameter according to the phase difference comprises:
   generating the calibration parameter according to the phase difference and a predetermined quadrature relationship between an in-phase component signal and a quadrature component signal among the plurality of first signals.

4. The signal calibration circuit according to claim 3, wherein the operation that the control circuit generates the calibration parameter according to the phase difference and the predetermined quadrature relationship between the in-phase component signal and the quadrature component signal of the plurality of first signals comprises:
   setting a phase of the second signal to a first phase;
   obtaining a first difference value between the first phase and a phase of the in-phase component signal;
   setting the phase of the second signal to a second phase;
   obtaining a second difference value between the second phase and a phase of the quadrature component signal; and
   generating the calibration parameter according to the first difference value, the second difference value, and the predetermined quadrature relationship between the in-phase component signal and the quadrature component signal.

5. The signal calibration circuit according to claim 1, wherein the operation that the delay circuit adjusts the at least one of the plurality of first signals according to the calibration parameter such that the plurality of first signals comprise the plurality of second quadrature signals comprises:
   delaying at least one of an in-phase component signal and a quadrature component signal among the plurality of first signals according to the calibration parameter, such that the in-phase component signal and the quadrature component signal are quadrature with each other.

6. The signal calibration circuit according to claim 1, further comprising:
   a multiplexer, coupled to the delay circuit and the phase detector,
   wherein the multiplexer is configured to transmit the one of the plurality of first signals to the phase detector according to a selection signal.

7. The signal calibration circuit according to claim 1, further comprising:
   a clock and data recovery circuit, coupled to the first phase interpolator,
   wherein the clock and data recovery circuit is configured to receive the plurality of second quadrature signals and a data signal and generate an output clock.

8. A memory storage device, comprising:
   a connection interface, configured to couple to a host system;
   a rewritable non-volatile memory module; and
   a memory control circuit, coupled to the connection interface and the rewritable non-volatile memory module,
   wherein the connection interface comprises a signal calibration circuit, the signal calibration circuit is configured to receive a plurality of first signals and generate a plurality of first quadrature signals according to the plurality of first signals, the signal calibration circuit is further configured to generate a second signal according to the plurality of first quadrature signals, the signal calibration circuit is further configured to detect a phase difference between the second signal and one of the plurality of first signals, the signal calibration circuit is further configured to generate a calibration parameter according to the phase difference, and the signal calibration circuit is further configured to adjust at least one of the plurality of first signals according to the calibration parameter, such that the plurality of first signals comprise a plurality of second quadrature signals.

9. The memory storage device according to claim 8, wherein the operation that the signal calibration circuit generates the plurality of first quadrature signals according to the plurality of first signals comprises:

performing a phase interpolation on an in-phase component signal and a quadrature component signal among the plurality of first signals to generate one of the plurality of first quadrature signals.

10. The memory storage device according to claim 8, wherein the operation that the signal calibration circuit generates the calibration parameter according to the phase difference comprises:

generating the calibration parameter according to the phase difference and a predetermined quadrature relationship between an in-phase component signal and a quadrature component signal among the plurality of first signals.

11. The memory storage device according to claim 10, wherein the operation that the signal calibration circuit generates the calibration parameter according to the phase difference and the predetermined quadrature relationship between the in-phase component signal and the quadrature component signal among the plurality of first signals comprises:

setting a phase of the second signal to a first phase;

obtaining a first difference value between the first phase and a phase of the in-phase component signal;

setting the phase of the second signal to a second phase;

obtaining a second difference value between the second phase and a phase of the quadrature component signal; and generating the calibration parameter according to the first difference value, the second difference value, and the predetermined quadrature relationship between the in-phase component signal and the quadrature component signal.

12. The memory storage device according to claim 8, wherein the operation that the signal calibration circuit adjusts the at least one of the plurality of first signals according to the calibration parameter such that the plurality of first signals comprise the plurality of second quadrature signals comprises:

delaying at least one of an in-phase component signal and a quadrature component signal among the plurality of first signals according to the calibration parameter, such that the in-phase component signal and the quadrature component signal are quadrature with each other.

13. The memory storage device according to claim 8, wherein the signal calibration circuit is further configured to transmit the one of the plurality of first signals to a phase detector through a multiplexer to detect the phase difference between the second signal and the one of the plurality of first signals.

14. The memory storage device according to claim 8, wherein the signal calibration circuit is further configured to receive the plurality of second quadrature signals and a data signal and generate an output clock.

15. A signal calibration method for a memory storage device comprising a signal calibration circuit, comprising:

receiving, by the signal calibration circuit, a plurality of first signals and generating a plurality of first quadrature signals according to the plurality of first signals;

generating, by the signal calibration circuit, a second signal according to the plurality of first quadrature signals;

detecting, by the signal calibration circuit, a phase difference between the second signal and one of the plurality of first signals;

generating, by the signal calibration circuit, a calibration parameter according to the phase difference; and adjusting, by the signal calibration circuit, at least one of the plurality of first signals according to the calibration parameter, such that the plurality of first signals comprise a plurality of second quadrature signals.

16. The signal calibration method according to claim 15, wherein the step of generating the plurality of first quadrature signals according to the plurality of first signals comprises:

performing a phase interpolation on an in-phase component signal and a quadrature component signal among the plurality of first signals to generate one of the plurality of first quadrature signals.

17. The signal calibration method according to claim 15, wherein the step of generating the calibration parameter according to the phase difference comprises:

generating the calibration parameter according to the phase difference and a predetermined quadrature relationship between an in-phase component signal and a quadrature component signal among the plurality of first signals.

18. The signal calibration method according to claim 17, wherein the step of generating the calibration parameter according to the phase difference and the predetermined quadrature relationship between the in-phase component signal and the quadrature component signal among the plurality of first signals comprises:

setting a phase of the second signal to a first phase;

obtaining a first difference value between the first phase and a phase of the in-phase component signal;

setting the phase of the second signal to a second phase;

obtaining a second difference value between the second phase and a phase of the quadrature component signal; and generating the calibration parameter according to the first difference value, the second difference value, and the predetermined quadrature relationship between the in-phase component signal and the quadrature component signal.

19. The signal calibration method according to claim 15, wherein the step of adjusting the at least one of the plurality of first signals according to the calibration parameter such that the plurality of first signals comprise the plurality of second quadrature signals comprises:

delaying at least one of an in-phase component signal and a quadrature component signal among the plurality of first signals according to the calibration parameter, such that the in-phase component signal and the quadrature component signal are quadrature with each other.

20. The signal calibration method according to claim 15, further comprising:
   transmitting, by the signal calibration circuit, the one of the plurality of first signals to a phase detector through a multiplexer to detect the phase difference between the second signal and the one of the plurality of first signals.

21. The signal calibration method according to claim 15, further comprising:
   receiving, by the signal calibration circuit, the plurality of second quadrature signals and a data signal and generating an output clock by a clock and data recovery circuit.

* * * * *